United States Patent [19]

Louw

[11] Patent Number: 4,632,511

[45] Date of Patent: Dec. 30, 1986

[54] SHIELD FOR A KEYBOARD

[76] Inventor: Franklin S. Louw, P.O. Box 1258, Bedfordview, Transvaal Province, South Africa

[21] Appl. No.: 710,146

[22] Filed: Mar. 11, 1985

[30] Foreign Application Priority Data

Mar. 21, 1984 [ZA] South Africa ........................ 84/2110
Sep. 10, 1984 [ZA] South Africa ........................ 84/7101

[51] Int. Cl.⁴ ................................................ G02B 27/00
[52] U.S. Cl. ...................................... 350/276 R; 109/2
[58] Field of Search .................... 350/276 R, 266, 268, 350/283, 284, 112, 276 SL; 52/171; 109/2, 5, 9, 10, 11, 53; 235/454, 455; 358/252, 254, 255; 340/711

[56] References Cited

U.S. PATENT DOCUMENTS 4,359,222 11/1982 Smith, III et al. .................. 340/711
4,417,527 11/1983 Williams et al. ......................... 109/9

FOREIGN PATENT DOCUMENTS 1368089 6/1964 France ................................ 358/254

*Primary Examiner*—John K. Corbin
*Assistant Examiner*—Loha Ben
*Attorney, Agent, or Firm*—Ladas & Parry

[57] ABSTRACT

An automatic banking facility having a keyboard 12 through which keys 12.1 are operable by a patron to provide access to the patron's account for making deposits or withdrawals, is provided with a shield mountable with clearance around or over at least some of the keys 12.1 to shield such keys from the view of bystanders when they are operated by a patron.

5 Claims, 6 Drawing Figures

SHIELD FOR A KEYBOARD

This invention relates to the operation of the keys of an automatic banking facility. Such a facility has a keyboard through which keys are operable. Operation of some of such keys by a patron provides access to the patron's account for making deposits or withdrawals.

SUMMARY OF THE INVENTION

According to the invention, there is provided a shield mountable in relation to the keyboard of an automatic banking facility so as to shield at least some of the keys from the view of bystanders when such keys are being operated by a patron, the shield including an opaque top panel and mounting means for mounting the panel with clearance in spaced relationship relative to the said keys, to provide an access opening for the fingers of a patron to operate the keys.

In the automatic banking facilities known to the Applicant, there are some keys whose operation need not be kept secret because knowledge of their operation will not provide access to an operator's banking account. Such keys need not therefore be shielded.

The shield may be spaced above the keys, to a convenient extent, to permit easy access for the fingers of a patron to operate the keys. For most purposes, the spacing of say, 5 cm, between the top of the keys and the shield, may be found to be adequate. The shield may include also a pair of spaced apart guide panels projecting downwardly from the under surface of the top panel to define the sides of the access opening. The guide panels may converge downwardly towards the keys so that the access opening is substantially trapezoidal in shape.

A representation or replica of those keys which are shielded may be provided on the top of the top panel, at least in general alignment with the shielded keys under the representation, to assist a patron in identifying the keys by touch and operating them. To assist in the identification by touch, a guide panel having guide apertures aligned with the keys may be provided immediately above the keys, but under the shield. The guide panel may be fast with the shield, and when made of synthetic plastics material, may be integrally moulded therewith.

The mounting means may be arranged so that the top panel will be mounted in sloping relationship relative to the keyboard of the automatic banking facility. The mounting means may include a plurality of spaced apart feet which can be screwed or adhesively secured to the keyboard of the automatic banking facility.

Thus, the shield may be fitted to existing banking facilities, by mounting over the keyboard. If it is permissible to do so, the shield may be screwed or rivetted to the banking facility. Alternatively, in new equipment, the shield may be provided as original equipment on the banking facility and may be integrally formed or moulded if need be, with the keyboard. Thus, the shield and keyboard may form a single integral unit, the keys projecting through or being operable through the keyboard portion of such unit.

The invention extends also to an automatic banking facility having a shield as described, shielding those keys by means of which a patron enters his secret code.

BRIEF DESCRIPTION OF THE DRAWINGS

The invention will now be described by way of example with reference to the accompanying diagrammatic drawings.

In the drawings.

DETAILED DESCRIPTION

Figure 1:
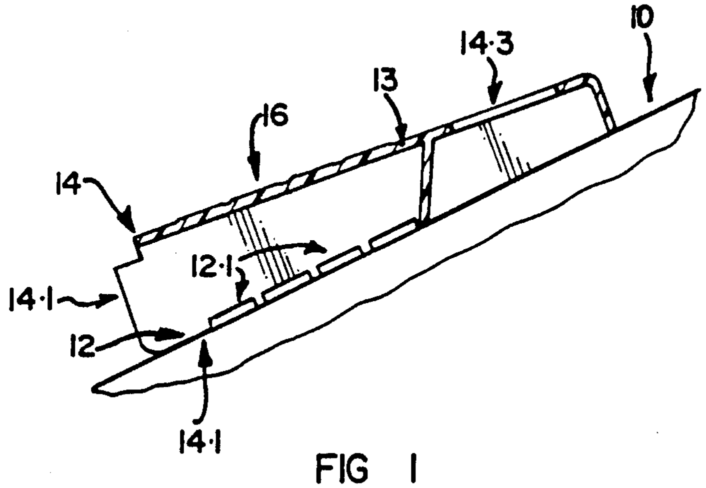
FIG. 1 shows a sectional elevation of one embodiment of a shield according to the invention, for an automatic banking facility of the kind described.
Figure 2:
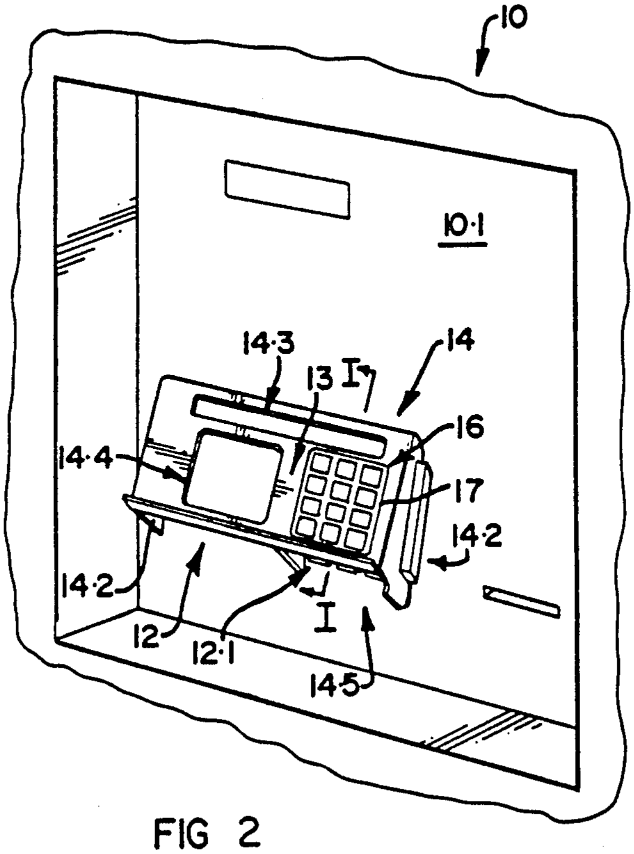
FIG. 2 shows an oblique front view of another embodiment of a shield in accordance with the invention, as applied to an automatic banking facility.

Referring to FIGS. 1 to 6 of the drawings, reference numeral 10 indicates generally an automatic banking facility having a keyboard 12, over which is mounted a shield 14 having an opaque top panel 13 spaced above and with clearance around or over at least some of the keys 12.1 of the keyboard 12, to provide an access opening 14.1 for the fingers of a patron for operating the keys 12.1 of the keyboard 12.

The shield 14, in use, prevents bystanders and, in some embodiments, even the patron himself/herself, from seeing those keys 12.1 of the keyboard relating to his/her account number, thereby preventing others from seeing the keys which are being operated by a patron. Such others are thereby prevented from becoming aware of the patron's secret code. On the opaque top panel 13 there is provided a representation or replica 16 of the keys 12.1 under the shield 14 so that a patron can identify the keys 12.1 by touch and operate them, without it being necessary for the patron to see the keys 12.1.

The shield 14 may conveniently be shaped or formed of a synthetic plastic material. The shield has feet 14.2, whereby it may be adhesively secured to the keyboard 12 or the outer face of a banking facility 10 on either side of the keys 12.1.

The representation 16 on the outer surface of the shield may be integrally moulded with the shield 14 or it may be provided in the form of a decal or panel 17 secured to the shield 14, in register with the keys 12.1 underneath. Apertures 14.3 and 14.4 may be provided to permit viewing of other keys or of instructions, as may be needed, if the keys 12.1 are otherwise adequately shielded.

Figure 3:
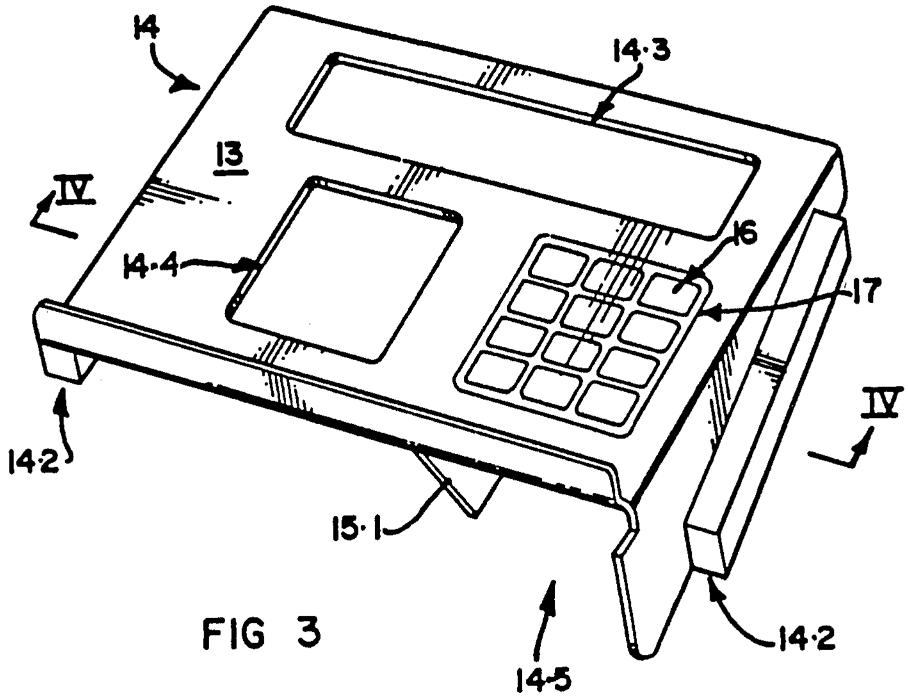
FIG. 3 shows an oblique front view to a larger scale of the embodiment of the shield of FIG. 2.
Figure 4:
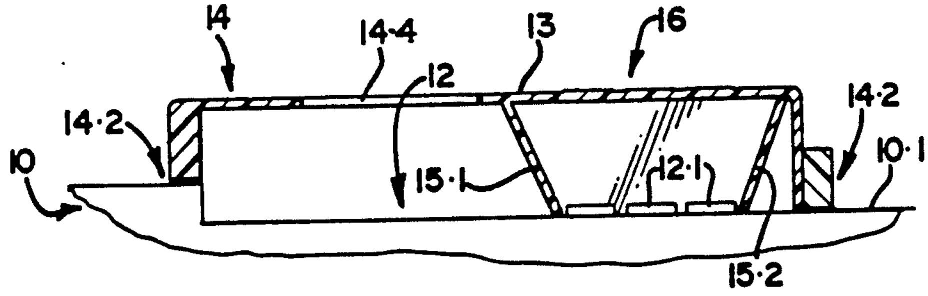
FIG. 4 shows a sectional front elevation at IV—IV in FIG. 3.
Figure 5:
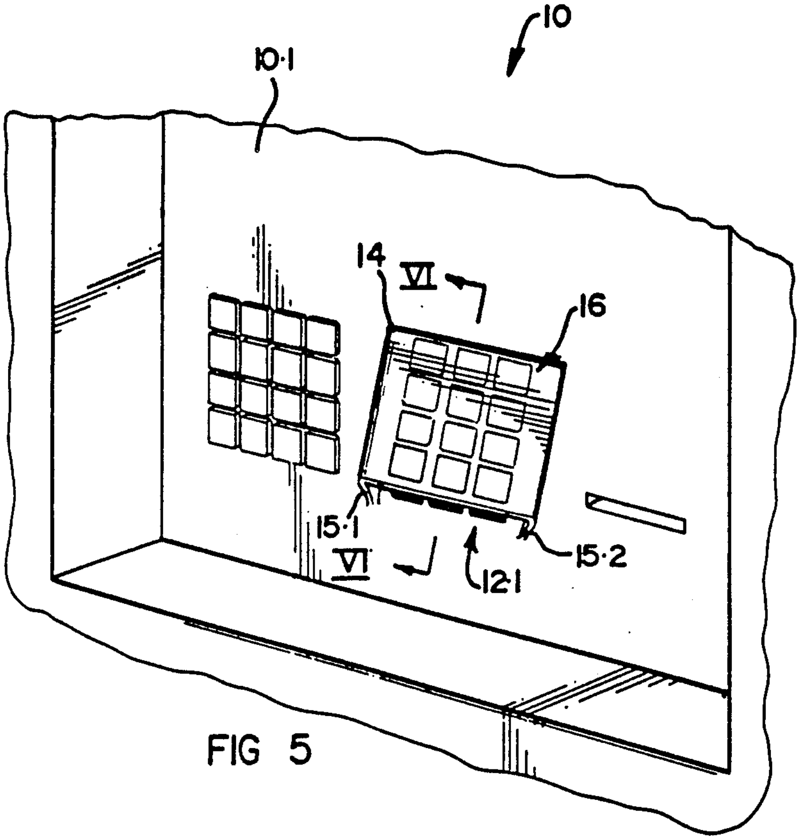
FIG. 5 shows an oblique front view of yet another embodiment of a shield in accordance with the invention, as applied to a banking facility.
Figure 6:
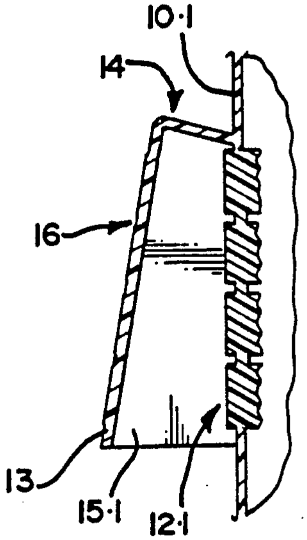
FIG. 6 shows a sectional elevation at VI—VI in FIG. 5.

The embodiment of shield 14 shown in FIG. 3 is adapted for mounting over the keys 12.1 of a facility 10 having its keys 12.1 in a vertical face 10.1. The top panel 13 of the shield 14 slopes relative to the keyboard surface 10.1. The keyboard surface 10.1 of a facility 10 may slope at any desired angle to the horizontal. The sloping top panel 13 provides the access opening 14.1 having a greater height than when the top panel 13 is parallel to the keyboard surface 10.1. The shield also has spaced apart guide panels 15.1 and 15.2 projecting downwardly from the undersurface of the opaque top panel 13.

These guide panels define the width of the access opening 14.1.

To facilitate operation of the keys, their upper surfaces may be concave, to guide a patron's fingers onto the centres of the keys.

Where needed, the shield or keyboard or both can be of a robust material to shield the keys also from physical damage by vandals.

It is an advantage of this invention that a patron can safely operate on his account at an automatic banking facility having a shield according to the invention, without running the risk of his secret code providing access to his account, becoming known. If the patron's code should become known to dishonest persons, then they may steal his token or rob him of his token, thus permitting them to gain access to his account. It could even happen that a token may be 'borrowed' for a short while and misused, and after replacement of the token after 'borrowing' the patron would not be aware that there had been unauthorized withdrawals from his account.

The Applicant believes that use of shields according to the invention at automatic banking facilities can lead to a reduction in crimes, some of which may be untraceable.

I claim:

1. A shield mountable in relation to the keyboard of an automatic banking facility so as to shield at least some of the keys of the keyboard from the view of bystanders when such keys are being operated by a patron, the shield including an opaque top panel; and mounting means for mounting the panel with clerance in spaced relationship relative to the said keys to provide an access opening for the fingers of a patron to operate the keys.

2. A shield as claimed in claim 1, wherein a representation of those keys which are shielded is provided on the top of the panel.

3. A shield as claimed in claim 1, wherein the mounting means includes a plurality of spaced apart feet which can be screwed or adhesively secured to the keyboard of the automatic banking facility.

4. An automatic banking facility having a shield as claimed in claim 1, in which the keys which are shielded are those by means of which a patron enters his secret code to secure access to his account.

5. An automatic banking facility having a shield forming an integral unit with the keyboard of the facility, the shield being adapted in use to shield at least some of the keys from the view of bystanders, the shield including an opaque top panel; and mounting means for mounting the panel with clearance in spaced relationship relative to the said keys to provide an access opening for the fingers of a patron to operate the keys.

* * * * *